May 29, 1928.
G. J. WARNDORF
BRAKE CONTROLLED CIRCUIT CLOSER
Filed Feb. 18, 1926
1,671,799
Fig. 1.
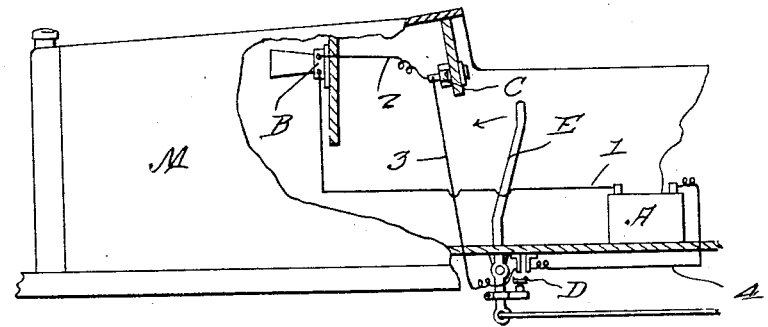
Fig. 2.
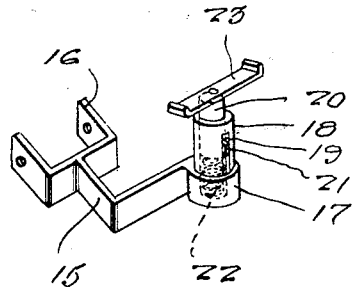
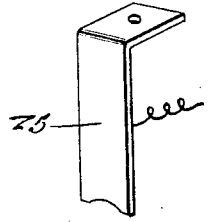
Fig. 3.
Inventor
G. J. Warndorf
By Clarence A O'Brien
Attorney Patented May 29, 1928.

1,671,799

UNITED STATES PATENT OFFICE.

GERHARD J. WARNDORF, OF CINCINNATI, OHIO.

BRAKE-CONTROLLED CIRCUIT CLOSER.

Application filed February 18, 1926. Serial No. 89,155.

The present invention relates to a brake actuated circuit closer designed for use with the signal circuit such as is claimed in my co-pending application, Serial No. 50,253, filed August 14, 1925, the subject matter of the present application having been divided therefrom.

The object of the invention is to provide a circuit closer of this nature which is exceedingly simple in its construction, strong and durable, compact, not likely to easily become out of order, sturdy for withstanding the rough usages to which it is necessarily put, and otherwise well adapted to the purpose for which it is designed.

With the above and numerous other objects in view as will appear as the description proceeds, the invention comprises certain novel features of construction, and in the combination and arrangement of parts as will be hereinafter more fully described and claimed.

In the drawing:

Figure 1 is a fragmentary sectional elevational view of an automobile showing my improved signal structure incorporated therein, Fig. 2 is a perspective view of the bridge element of the emergency brake controlled switch, and Fig. 3 is a perspective view of one of the elements thereof.

Referring to the drawing in detail, it will be seen that M designates an automobile or any other suitable vehicle in which I provide a circuit including the battery or other source of electrical energy A, from which leads a wire 1 to an electric horn or other audible electric signal B.

A wire 2 leads from the horn B to a lock controlled switch C which is claimed and specifically described in the application filed on even date with the present application. A wire 3 leads from the lock controlled switch C to the emergency brake controlled switch D forming the subject matter of the present application, and from which leads the wire 4 to the battery A.

Referring now particularly to my improved emergency brake lever operated switch, it will be seen that a bracket 15 has a yoke 16 at one end for engagement with the emergency brake lever and terminates at its other end in a sleeve 17 for receiving a cylindrical member 18 having a slot 19. A member 20 is slidable in the cylinder 18 and has a pin 21 movable in the slot 19. A spring 22 is disposed in the cylinder 18 for normally holding the member 20 projected. A bridge element 23 is mounted on the member 20 and when the emergency brake E is released, this bridge member engages the terminals of the spaced contacts 25.

Whenever an automobile is left standing, the emergency brake should be applied for obvious well known reasons, and when applied the bridge elements 23 are out of engagement with the spaced contacts 25, thereby braking the circuit described above.

The operator before leaving the machine operates the lock controlled switch for completing the circuit therethrough in a manner described in my above referred-to co-pending applications. It is obvious that should an unauthorized person attempt to start the machine, it will be necessary to release the emergency brake, and the release of this emergency brake will bring the bridge element 23 in engagement with the contact 25, thereby closing the circuit to sound the alarm D.

The present embodiment of the invention has been disclosed in detail because it in actual practice attains the features of advantage enumerated as desirable in the statement of the above description. Numerous changes in the details of construction, may be resorted to without departing from the spirit or scope of the invention as hereinafter claimed, or sacrificing any of its advantages.

Having thus described my invention, what I claim as new is:—

A circuit closing device including a bracket terminating at one end in a yoke and at its other end in a sleeve, a cylinder fixed in the sleeve, a member slidable in the cylinder and having a pin projection, said cylinder having a slot for receiving the pin projections, a spring in the cylinder impinging against the member to normally hold the same projected from the cylinder, and a contact bridging element on the outer end of the member.

In testimony whereof I affix my signature.

GERHARD J. WARNDORF.